(12) United States Patent
Wu

(10) Patent No.: US 12,229,771 B2
(45) Date of Patent: Feb. 18, 2025

(54) ACCOUNT BINDING METHOD AND APPARATUS, COMPUTER DEVICE, AND STORAGE MEDIUM

(71) Applicant: TENCENT TECHNOLOGY (SHENZHEN) COMPANY LIMITED, Guangdong (CN)

(72) Inventor: Shuzhen Wu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 247 days.

(21) Appl. No.: 17/680,233

(22) Filed: Feb. 24, 2022

(65) Prior Publication Data
US 2022/0327536 A1 Oct. 13, 2022

Related U.S. Application Data

(63) Continuation of application No. PCT/CN2020/133585, filed on Dec. 3, 2020.

(30) Foreign Application Priority Data

Mar. 16, 2020 (CN) .......................... 202010182516.8

(51) Int. Cl.
*G06Q 20/40* (2012.01)
*G06F 9/54* (2006.01)
(52) U.S. Cl.
CPC ........... *G06Q 20/401* (2013.01); *G06F 9/547* (2013.01)
(58) Field of Classification Search
None
See application file for complete search history.

(56) References Cited

U.S. PATENT DOCUMENTS 5,420,926 A * 5/1995 Low .................. G06Q 20/02
713/180
11,188,957 B1 * 11/2021 Sprague ................. H04L 51/52
(Continued)

FOREIGN PATENT DOCUMENTS

CN 201600745 U 10/2010
CN 107204957 A 9/2017
(Continued)

OTHER PUBLICATIONS

International Search Report and Written Opinion issued Mar. 9, 2021 in PCT/CN2020/133585.
(Continued)

*Primary Examiner* — Mike Anderson
*Assistant Examiner* — Matthew Cobb
(74) *Attorney, Agent, or Firm* — ArentFox Schiff LLP

(57) ABSTRACT

The present disclosure includes an account binding method. In the method, an account addition page is presented in a first application that is currently logged into using an application account of the first application. Information acquisition instruction carrying user identity information in an encrypted form is transmitted to an account provider system, in response to an account addition instruction triggered. A to-be-bound account that is associated with the user identity information and acquired and fed back by the account provider system is received. The received to-be-bound account is displayed on a gateway page of the account provider system. Also, binding between the application account of the first application and the to-be-bound account is performed, when the displayed to-be-bound account is confirmed by a user operation of the gateway page.

15 Claims, 8 Drawing Sheets

(56) References Cited

U.S. PATENT DOCUMENTS

| | | | | |
|---|---|---|---|---|
| 11,315,091 B2* | 4/2022 | Vaananen | ............... | H04W 4/24 |
| 2015/0127526 A1 | 5/2015 | Ye et al. | | |
| 2015/0278779 A1* | 10/2015 | Pfeifer | ................ | G06Q 20/384 |
| | | | | 705/39 |
| 2016/0307183 A1* | 10/2016 | Faith | .................... | G06Q 20/325 |
| 2017/0213212 A1* | 7/2017 | Dicker | ............... | G06Q 20/4015 |

FOREIGN PATENT DOCUMENTS

| | | |
|---|---|---|
| CN | 109544135 A | 3/2019 |
| CN | 110618937 A | 12/2019 |
| CN | 110798833 A | 2/2020 |

OTHER PUBLICATIONS

Chinese Office Action issued Jan. 20, 2023 in Application No. 202010182516.8, with Concise English Translation, p. 1-10.

* cited by examiner

ACCOUNT BINDING METHOD AND APPARATUS, COMPUTER DEVICE, AND STORAGE MEDIUM

RELATED APPLICATION

This application is a continuation of International Application No. PCT/CN2020/133585, entitled "ACCOUNT NUMBER BINDING METHOD AND APPARATUS, AND COMPUTER DEVICE AND STORAGE MEDIUM" and filed on Dec. 3, 2020, which claims priority to Chinese Patent Application No. 202010182516.8, entitled "ACCOUNT BINDING METHOD AND APPARATUS, COMPUTER DEVICE, AND STORAGE MEDIUM" filed on Mar. 16, 2020. The entire disclosures of the prior applications are hereby incorporated by reference in their entirety.

FIELD OF THE TECHNOLOGY

This application relates to the technical field of computers, including an account binding method and apparatus, a computer device, and a storage medium.

BACKGROUND OF THE DISCLOSURE

With the continuous development of the computer technology and the Internet technology, more and more users tend to perform resource transferring and management operations online. For example, a user binds a third-party account by using a webpage or a client of a resource provider, so as to perform corresponding operations by using the third-party account. The user may add the account of oneself or an account of another person by entering the account identifier during use of the webpage or the client, to achieve account binding. In this way, a target operation may be performed by using the bound account on the webpage or the client. However, it will take a lot of time to perform the account binding by using the foregoing account binding solution.

SUMMARY

Various embodiments of this application provide an account binding method and apparatus, a computer device, and a non-transitory computer-readable storage medium.

An embodiment of the present disclosure provides an account binding method. In the method, an account addition page is presented, by processing circuitry of a computer device, in a first application that is currently logged into using an application account of the first application. Information acquisition instruction carrying user identity information in an encrypted form is transmitted to an account provider system, by the processing circuitry of the computer device in response to an account addition instruction triggered by using the account addition page. A to-be-bound account that is associated with the user identity information and acquired and fed back by the account provider system is received, the to-be-bound account comprising a user account of a second application and being fed back after the user identity information is authenticated by the account provider system and after a verification process is performed via a communication device of the to-be-bound account. The received to-be-bound account is displayed on a gateway page of the account provider system by the processing circuitry of the computer device. Also, binding between the application account of the first application and the to-be-bound account is performed by the processing circuitry of the computer device, when the displayed to-be-bound account is confirmed by a user operation of the gateway page.

An embodiment of the present disclosure further provides an account binding apparatus. The account binding apparatus includes processing circuitry that is configured to present an account addition page in a first application that is currently logged into using an application account of the first application. The processing circuitry is configured to transmit, to an account provider system in response to an account addition instruction triggered by using the account addition page, an information acquisition instruction carrying user identity information in an encrypted form, and receive a to-be-bound account that is associated with the user identity information and acquired and fed back by the account provider system, the to-be-bound account comprising a user account of a second application and being fed back after the user identity information is authenticated by the account provider system and after a verification process is performed via a communication device of the to-be-bound account. The processing circuitry is configured to display the received to-be-bound account on a gateway page of the account provider system, and binding between the application account of the first application and the to-be-bound account when the displayed to-be-bound account is confirmed by a user operation of the gateway page.

An embodiment of the present disclosure further provides a non-transitory computer-readable storage medium storing instructions which when executed by a processor cause the processor to perform account binding. An account addition page is presented in a first application that is currently logged into using an application account of the first application. Information acquisition instruction carrying user identity information in an encrypted form is transmitted to an account provider system, in response to an account addition instruction triggered by using the account addition page. A to-be-bound account that is associated with the user identity information and acquired and fed back by the account provider system is received, the to-be-bound account comprising a user account of a second application and being fed back after the user identity information is authenticated by the account provider system and after a verification process is performed via a communication device of the to-be-bound account. The received to-be-bound account is displayed on a gateway page of the account provider system. Also, binding between the application account of the first application and the to-be-bound account is performed, when the displayed to-be-bound account is confirmed by a user operation of the gateway page.

Details of one or more embodiments of this application are provided in the accompanying drawings and descriptions below as non-limiting examples.

DESCRIPTION OF EMBODIMENTS

To make objectives, technical solutions, and advantages of this application clearer and more comprehensible, this application is further described in detail with reference to the accompanying drawings and embodiments. It is to be understood that the specific embodiments described herein are only used for explaining this application, and are not used for limiting this application.

Figure 1:
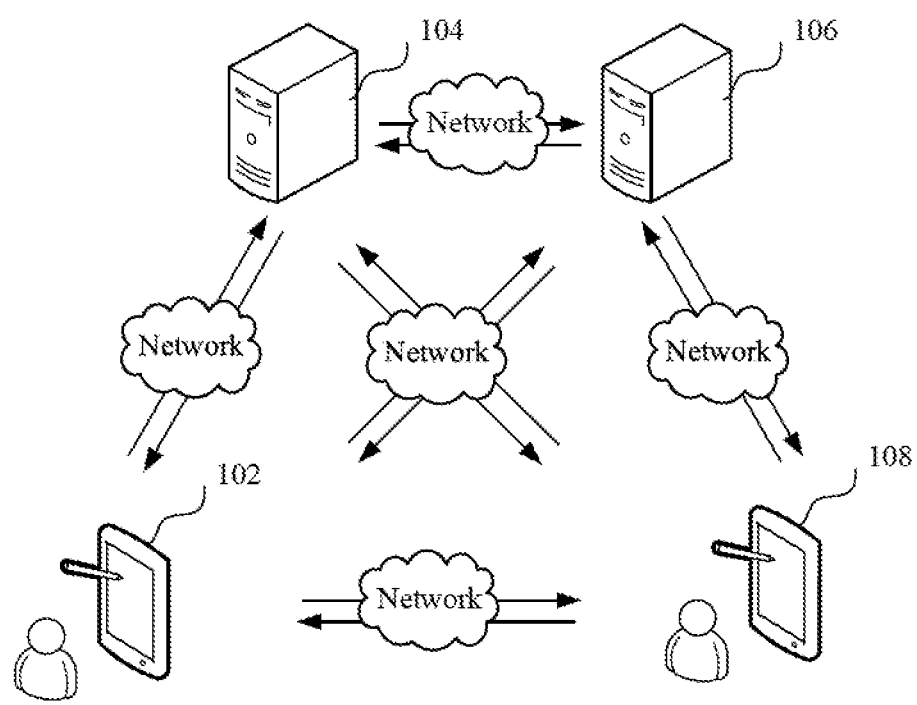
FIG. 1 is an application environment diagram of an account binding method according to an embodiment.

An account binding method provided in this application is applicable to an application environment shown in FIG. 1. A terminal 102, a server 104, a server 106, and a terminal 108 communicate with each other via a network. The terminal 102 presents an account addition page. When an account addition instruction triggered by using the account addition page is acquired, an information acquisition instruction carrying user identity information is transmitted to an account provider system (also referred to in this disclosure as "an account provider". e.g., the server 104 or the server 106). A to-be-bound account associated with the user identity information that is acquired by the account provider (the server 104 or the server 106) is received and displayed. When the displayed to-be-bound account is confirmed, the displayed to-be-bound account is bound to the confirmed to-be-bound account.

1) In an application scenario for account binding of a resource card (such as a bank card), the server 104 may be a server on a local application side, such as a server corresponding to a WeChat side (the server may be understood as a server of a WeChat account provider). The server 106 may be a server of a resource card provider, such as a server of a bank. An account of the resource card is a user account applicable to a resource application.

When an information acquisition instruction of the terminal 102 is received, the server 104 transmits the information acquisition instruction to the server 106. When the server 106 receives the information acquisition instruction, and user identity information (or being referred to as the user identity in this disclosure) in the information acquisition instruction is the user identity of a user, the to-be-bound account associated with the user identity is acquired. Then, the to-be-bound account is transmitted to the server 104, so that the server 104 feeds back the to-be-bound account to the terminal 102.

When the user identity in the information acquisition instruction is the user identity of another person, the server 106 acquires a corresponding reserved communication mode according to the user identity, and transmits a confirmation request to the terminal 108 according to the reserved communication mode. The terminal 108 presents the confirmation request, and forwards a confirmation instruction to the server 106 when the confirmation instruction in response to the confirmation request is received. When the confirmation instruction is received, the server 106 acquires the to-be-bound account associated with the user identity, and then transmits the to-be-bound account to the server 104. When the to-be-bound account is received, the server 104 feeds back the to-be-bound account to the terminal 102.

2) In an application scenario for account binding of a resource card (such as a preferential card or a shopping card), the server 104 may be a server on a local application side, such as a server corresponding to a WeChat side. The server 106 may be a server of a resource card provider. An account of the resource card is a user account applicable to a resource application.

When an information acquisition instruction of the terminal 102 is received, the server 104 transmits the information acquisition instruction to the server 106. When the server 106 receives the information acquisition instruction, the to-be-bound account associated with the user identity is acquired, and then the to-be-bound account is transmitted to the server 104, so that the server 104 feeds back the to-be-bound account to the terminal 102.

3) In an application scenario for account binding of a first application (that is, a local application), the server 104 may be a server on a local application side, such as a server corresponding to a WeChat side. In addition, when the user identity is the user identity of another person, the terminal 108 may be a terminal that uses the user identity to log in to the local application. For example, when a WeChat user A wants to bind an account associated with a WeChat user B, the terminal 108 may be a terminal used by the WeChat user B.

When the user identity is the user identity of another person, the server 104 may transmit a confirmation request to the terminal 108 when the information acquisition instruction of the terminal 102 is received. The terminal 108 displays the confirmation request, and forwards a confirmation instruction to the server 104 when the confirmation instruction in response to the confirmation request is received. When the confirmation instruction is received, the server 104 acquires the to-be-bound account associated with the user identity, and then feeds back the to-be-bound account to the terminal 102.

When the user identity is the user identity of the user, the server 104 does not transmit the confirmation request to the terminal, directly acquires the to-be-bound account associated with the user identity, and then feeds back the to-be-bound account to the terminal 102.

4) In an application scenario for account binding of a second application (that is, other applications), the server 104 may be a server on the first application (that is, the local application) side, such as a server corresponding to a WeChat side. The server 106 may be servers of other application developers, such as a server of a short video developer. In addition, when the user identity is the user identity of another person, the terminal 108 may be a terminal logging in to other applications. For example, when the WeChat user A wants to bind a JD account of the WeChat user B (such as a relative or a friend), the terminal 108 may be a terminal used to log in to the JD account.

5) In an application scenario for account binding of a transportation card (such as a bus card or a metro card), the server 104 may be a server on a local application side, such as a server corresponding to a WeChat side. The server 106 may be a server of a transportation card provider. An account of the transportation card may refer to a user account of the transportation card used in a transportation application.

When an information acquisition instruction of the terminal 102 is received, the server 104 transmits the information acquisition instruction to the server 106. When the server 106 receives the information acquisition instruction, the to-be-bound account associated with the user identity is acquired, and then the to-be-bound account is transmitted to the server 104, so that the server 104 feeds back the to-be-bound account to the terminal 102.

6) In an application scenario for account binding of a social security card, the server 104 may be a server on a local application side, such as a server corresponding to a WeChat side. The server 106 may be a server of a social security card provider. An account of the social security card may refer to a user account used in a social security application.

When an information acquisition instruction of the terminal 102 is received, the server 104 transmits the information acquisition instruction to the server 106. When the server 106 receives the information acquisition instruction, the to-be-bound account associated with the user identity is acquired, and then the to-be-bound account is transmitted to the server 104, so that the server 104 feeds back the to-be-bound account to the terminal 102.

7) In an application scenario for account binding of a driving license, the server 104 may be a server on a local application side, such as a server corresponding to a WeChat side. The server 106 may be a server of a driving license provider. An account of the driving license may refer to a user account of the driving license used in a traffic application.

The terminal 102 and the terminal 108 may be but is not limited to any personal computer, notebook computer, smartphone, tablet computer, and portable wearable device. The server 104 and the server 106 may be implemented by an independent server or a server cluster that includes a plurality of servers.

Figure 2:
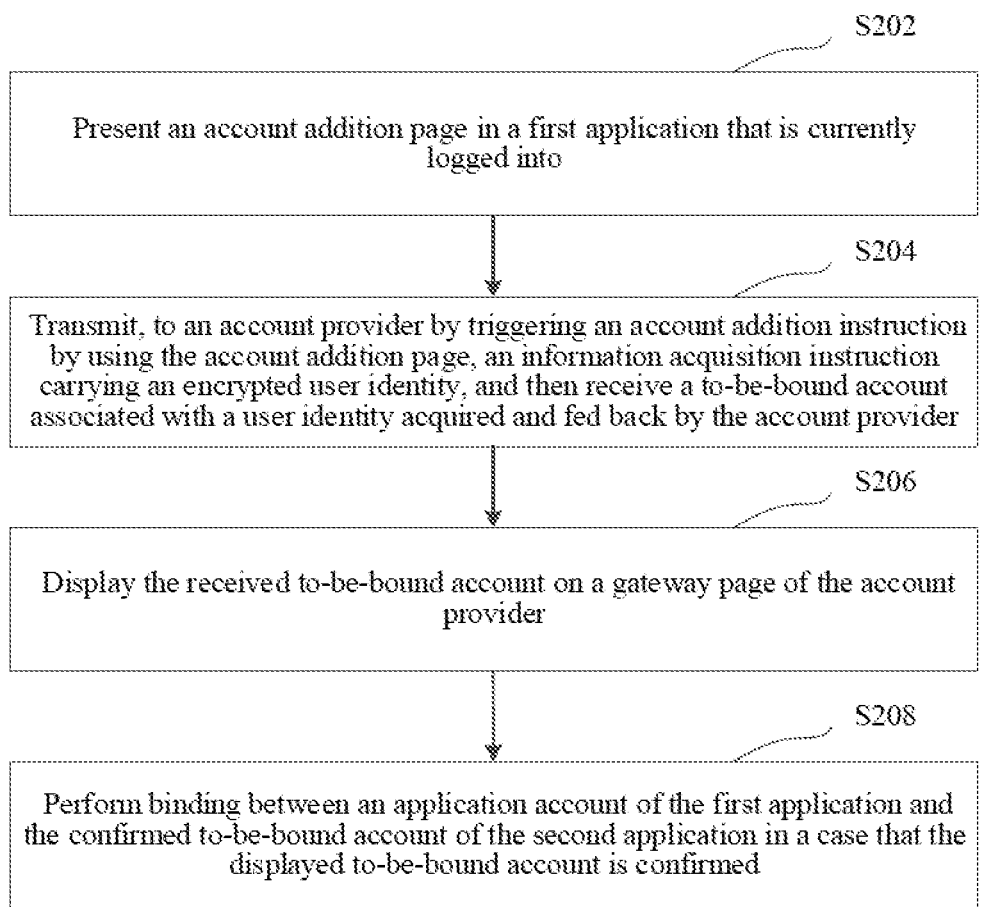
FIG. 2 is a flowchart of an account binding method according to an embodiment.

In an embodiment, as shown in FIG. 2, an account binding method is provided. The account binding method is performed by a computer device. The computer device includes, but is not limited to, a server or a terminal. The method applicable to the terminal 102 in FIG. 1 is used as an example for description. The method includes the following operations.

In Step S202, an account addition page is presented in a first application that is currently logged into using an application account of the first application.

In an embodiment, after the terminal starts the first application, the account addition page for account binding may be presented by using the first application. The first application may be an application having a payment function, and includes, but is not limited to, a social application having a payment function, a payment application, a shopping application, or the like. The foregoing account may be a card account of the resource card. The resource card may specifically be a bank card (including a deposit card and a credit card) and other types of cards available for payment. In addition, the account may further be an account of the first application, such as a social account, a shopping account, a small video application account, a game account, and the like.

In an embodiment, in an application scenario for card account binding of the resource card, the terminal logs in to the first application, and a user home page of the first application is presented. When a trigger operation on a payment button in the user home page is detected, a payment management page is entered. There is a resource presenting area on the payment management page. User resources are displayed in the resource presenting area. In addition, a resource button is provided in the resource presenting area. When a trigger operation on the resource button in the payment management page is detected, the terminal switches the payment management page to a resource management page. A card management button is provided in the resource management page. When a trigger operation on the management button in the resource management page is detected, the terminal switches the resource management page to a card management page. A card addition button is provided on the card management page. When a trigger operation on the card addition button in the card management page is detected, the terminal switches the card management page to a user verification page. When a user is authenticated, the terminal switches the user verification page to the account addition page.

Figure 3:
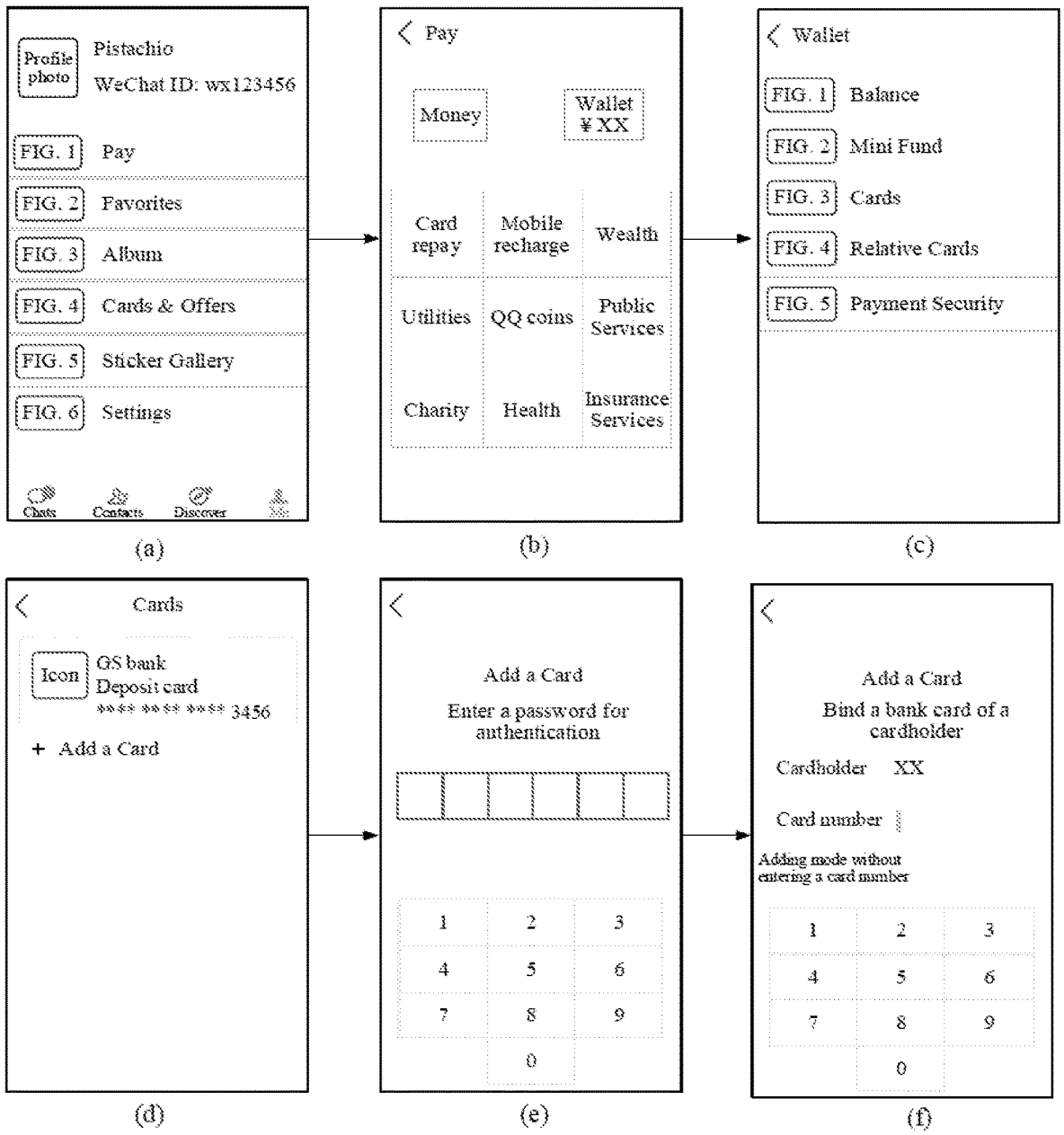
FIG. 3 is a schematic diagram showing entering an account addition page with a function of account addition without entering an account identifier according to an embodiment.

For example, the first application being a social application having the payment function is used as an example. As shown in FIG. 3, FIG. 3 (*a*) is the user home page, FIG. 3 (*b*) is the payment management page, FIG. 3 (*c*) is the resource management page, FIG. 3 (*d*) is the card management page, FIG. 3 (*e*) is the user verification page, and FIG. 3 (*f*) is the account addition page.

In an embodiment, in the application scenario for account binding of the first application, the terminal logs in to the first application, and the user home page of the first application is presented. By tapping an account addition button (an account binding button) of the home page, the account addition page may be entered.

In an embodiment, a control of a function of account addition without entering an account identifier (e.g., a card number of an account number) is set on the account addition page, so that a subsequent process of account addition without entering an account identifier can be performed accordingly.

In an embodiment, when the terminal logs in to the first application by using a user account, an application account corresponding to the user account is determined. The application account has the corresponding user account and a corresponding password. In addition, the terminal may further acquire a corresponding user name, a corresponding phone number, and corresponding identity information (such as an identity type and a corresponding identity number) according to the user account.

In an embodiment, the terminal acquires a password of the application account entered by the user, and then compares the password entered by the user with a previously saved password. If the passwords are the same, the user is authenticated. Alternatively, the terminal transmits the acquired password to the server, so that the server performs correctness verification on the password. When the password is the correct password, a result of passing the verification is fed back to the terminal. In this case, the terminal presents the account addition page.

In step S204, an information acquisition instruction carrying an encrypted user identity (or the user identity information in the encrypted form) is transmitted to an account provider in response to an account addition instruction is triggered by using the account addition page, and then a to-be-bound account that is associated with a user identity and acquired and fed back by the account provider is received.

The foregoing to-be-bound account includes a user account of a second application and is an account fed back after the user identify information is authenticated by the account provider and after a verification process is performed via a communication device of the to-be-bound account. For example, the to-be-bound account may be an account of a transportation card used on a traffic application, that is, a transportation card account of the user. In another example, the to-be-bound account may be the user account of the social application.

In an embodiment, when the account addition instruction triggered by using the account addition page is acquired, the information acquisition instruction carrying the encrypted user identity is transmitted to the account provider.

The account provider may refer to a party providing an account, for example, a bank providing a bank card, or a merchant providing a shopping card (or consumption coupons), or an application developer providing a social account, an institution providing a transportation card account, a social security card account or a driving license account, or the like. In the subsequent embodiments, the account provider may refer to a server or other devices corresponding to the account provider. The account addition without entering an account identifier corresponds to that the user is not required to manually enter account numbers during account binding, and a user who does not have the knowledge of the to-be-bound account may also bind an account.

In an embodiment, when an addition instruction corresponding to account addition without entering an account identifier triggered by using the account addition page is acquired, the terminal jumps from the account addition page to an account provider selection page, determines the account provider from candidate account providers displayed on the account provider selection page, and transmits, to the account provider, the information acquisition instruction carrying the user identity.

In an embodiment, when the information acquisition instruction transmitted by the terminal is received, the account provider extracts the user identity from the information acquisition instruction, then acquires the to-be-bound account associated with the user identity, and then returns the to-be-bound account. Before the to-be-bound account is returned, the account provider may attempt to authenticate the user identity, and then transmits a verification request to the communication device of the to-be-bound account. When the communication device feeds back confirmation information after the user identity is authenticated, the to-be-bound account is returned.

For example, when the user needs to bind a bank account of himself/herself or a family member, an option "account addition without entering a card number" (or "account addition without entering an account identifier") may be selected on the account addition page. Then when the page jumps to a bank selection page, a bank to which the to-be-bound bank account belongs (for example, when a GS bank account is to be bound, a GS bank is selected) is selected on the selection page. Then the terminal transmits, to the bank, the information acquisition instruction carrying the user identity. After receiving the information acquisition instruction, the bank extracts the user identity, then determines whether the to-be-bound account associated with the user identity exists, and if so, transmits the to-be-bound account.

The foregoing association relationship is used for indicating that there is an association between the user identity and the to-be-bound account. A specific pattern of manifestation of the association relationship may include the following: when the user identity of the user is also saved in a data table saving the to-be-bound account, or when the to-be-bound account of the user is also saved in a data table saving the user identity, it indicates that there is an association relationship between the user identity and the to-be-bound account. For example, when a user A applies for a bank card (such as a credit card or a deposit card) at a bank, the bank saves a user identity and a bank card account of the user A in a data table, which indicates that there is an association relationship between the user identity of the user A and the to-be-bound account.

In an embodiment, in the application scenario for card account binding of the resource card, when the addition instruction corresponding to account addition without entering an account identifier triggered by using the account addition page is acquired, the terminal further determines a card type (such as the deposit card and the credit card) of the to-be-bound card account, an account provider, a communication address (such as a communication account) of the account provider, and the like according to the entered instruction.

In an embodiment, in the application scenario for account binding of the first application, when the addition instruction corresponding to account addition without entering an account identifier triggered by using the account addition page is acquired, the terminal further determines an application provider (that is, the account provider) of the to-be-bound account and a corresponding communication address according to the entered instruction.

In an embodiment, an entry provided for selecting a candidate account provider is set on the selection page. The candidate account provider is displayed in a display area of the entry. The candidate account provider may be an account provider cooperating with a developer of the first application. The display area for displaying each candidate account provider is set in the selection page. The user may select, from the candidate account providers displayed in the selection page, the account provider of the to-be-bound account. The displayed candidate account provider refers to an identifier for displaying the candidate account provider.

For example, when the user wants to bind a GS bank account of himself/herself or a family member in the first application that is currently logged into, the GS bank may be selected in the selection page. For a bank whose name is not displayed in the selection page, a bank account of the bank cannot be bound. In another example, when the user wants to bind an account (for example, bind a social account or a small video application account) of the current application or a third-party application in the first application that is currently logged into, the current application or the third-party application may be selected in the selection page. For a first application whose name is not displayed in the selection page, an account of the first application cannot be bound.

In an embodiment, the terminal displays candidate account providers on the selection page. When the user selects one account provider from the candidate account providers as a provider of a to-be-bound account, a confirmation window pops up at the terminal. When an OK button of the confirmation window is triggered, the information acquisition instruction carrying the user identity is generated, and then the information acquisition instruction carrying the user identity is transmitted to the account provider and the selection page is caused to jump to a gateway page.

In the application scenario for card account binding of the resource card, the gateway page may refer to an independent page developed by the resource card provider for a quick payment process, to support the user to jump to the independent page to complete quick payment binding during the account binding.

In the application scenario for account binding of the first application, the gateway page may refer to an independent page developed by the account provider for two parties to quickly bind accounts to increase traffic, to support the user to jump to the independent page to complete quick binding during the account binding.

In some embodiments, the selection page after the user selects a binding function of account addition without entering an account identifier is an H5 page (e.g., a web page format supported by WeChat). When an account provider is required to be added (for example, adding a bank to be supported or other application developers), configuration may also be directly used for direct implementation. After the user first selects the to-be-bound account, it can jump to the corresponding gateway page. For the jumping support of the gateway page, permission parameters for jumping to the gateway page may be configured, and the corresponding account provider is designated for jumping.

Figure 4:
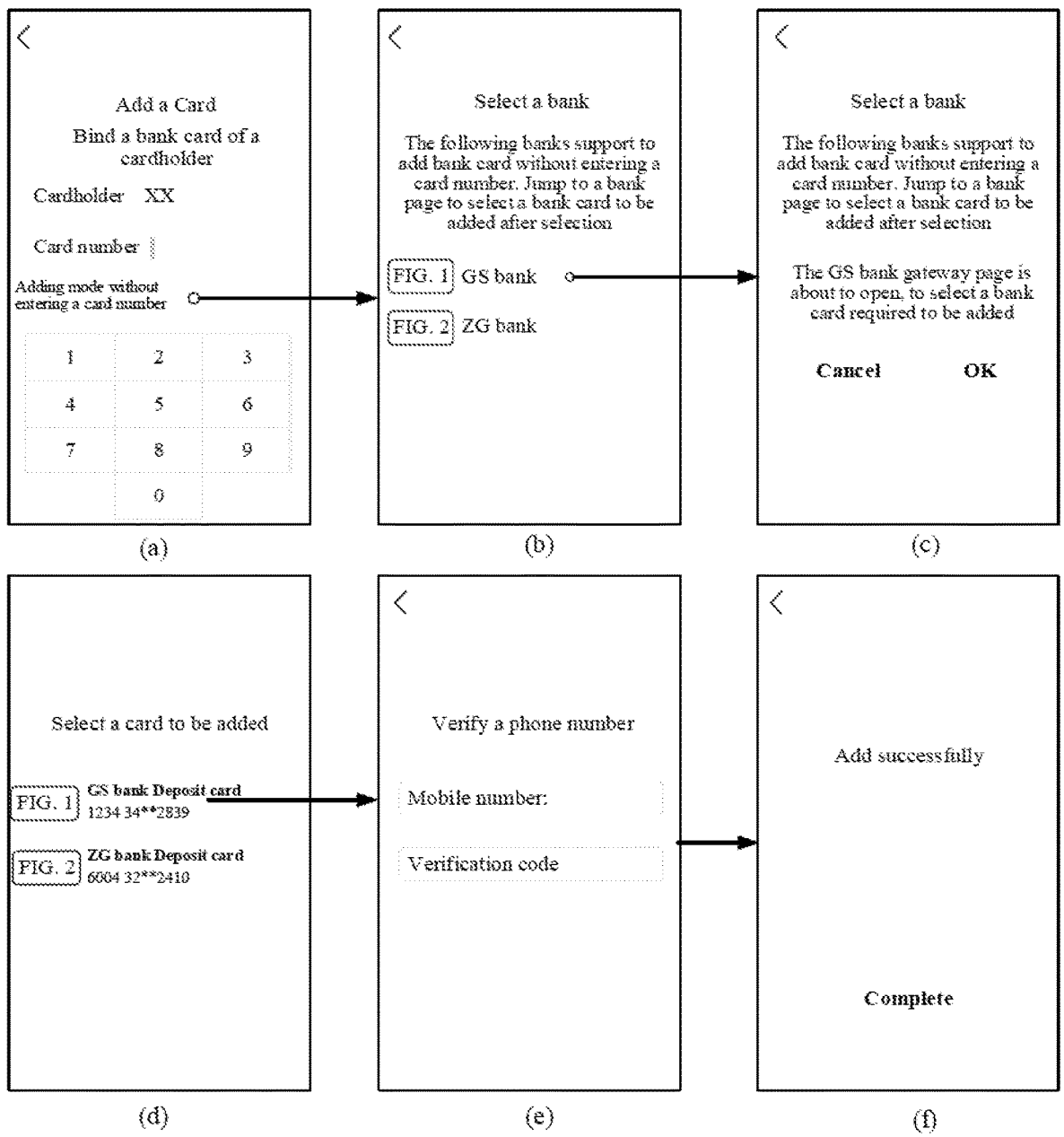
FIG. 4 is a schematic diagram showing binding a card without entering an account identifier according to an embodiment.

For example, the application scenario for card account binding of the resource card is used as an example. As shown in FIG. 4, the user selects an adding mode of account addition without entering a card number in FIG. 4(a), a terminal page jumps to FIG. 4(b), the GS bank is selected in FIG. 4(b) as a bank of a to-be-bound account, and then the confirmation window pops up, as shown in FIG. 4(c). The user may select the OK button on the confirmation window to enter the gateway page, as shown in FIG. 4(d).

In an embodiment, the terminal detects, in real time, whether a control regarding the function of account addition without entering an account identifier on the account addition page is triggered. When a trigger operation is detected, the addition instruction corresponding to account addition without entering an account identifier may be obtained. When the addition instruction is obtained, the terminal jumps the account addition page to the selection page for displaying the candidate account provider, and acquires the user identity. The user identity may be a user name, identity information of the user, and the like.

In an embodiment, the terminal selects the account provider from the candidate account providers displayed in the selection page according to a selection instruction of the user, then generates the information acquisition instruction carrying the user identity, and transmits the information acquisition instruction to the account provider.

In an embodiment, the terminal acquires a first bound account bound to the application account on the first application, or acquires a first unbound account unbound from the application account on the first application, and determines, according to the first bound account or the first unbound account, the candidate account providers for displaying on the selection page. Therefore, the candidate account providers that may be displayed may be determined by using the accounts that have been bound or unbound by the user, to prevent the first application from not supporting the account provider corresponding to the to-be-bound account by the user, so as to avoid poor user experience as a result of the user still seeing the entry of the account provider, thereby enhancing user experience. The first application is the application to which the terminal currently logs in. The displayed candidate account provider refers to an identifier of the displayed candidate account provider.

For example, assuming that the user has bound two bank cards on the first application, the bank card a is in a bound state, and the bank card b is in an unbound state (that is, the user has unbound the bank card b). In another example, assuming that the user has bound accounts of two other applications on the first application, the account of the application a is in a bound state, and the account of the application b is in an unbound state (that is, the user has unbound the account of the application b).

In an embodiment, in the application scenario for card account binding of the resource card, the terminal acquires a card type corresponding to the first bound account and acquires a card type of the first unbound account. Then the terminal determines, according to the first bound account and the corresponding card type and the first unbound account and the corresponding card type, the candidate account providers for displaying on the selection page.

In an embodiment, in addition to the first bound account bound to the application account and the first unbound account unbound from the application account, the terminal may further acquire a provider name of the first bound account and a provider name of the first unbound account, and determine, according to the foregoing provider names, the candidate account providers for displaying on the selection page. For example, when the provider name of the first bound account is the GS bank, and the provider name of the first unbound account is a ZG bank it may be determined, according to the provider names of the GS bank and the ZG bank, that the first application supports binding functions of the GS bank and the ZG bank. Therefore, the GS bank and the ZG bank may be determined as the candidate account providers to be displayed on the selection page. In this way, the first application is prevented from not supporting the account provider corresponding to the to-be-bound account by the user, so as to avoid poor user experience as a result of the user seeing the entry of the account provider, thereby enhancing user experience.

In an embodiment, in the application scenario for card account binding of the resource card, when the application account on the first application is bound to the card account of the resource card, the bound card account (that is, the first bound account) and a corresponding state are saved in an information list. In addition, when the application account on the first application is unbound from the card account of the resource card, the terminal also updates a state of the unbound card account (that is, the first unbound account) in the information list.

In an embodiment, the terminal searches for an associated application account associated with the application account, acquires a second bound account bound to the associated application account, or acquires a second unbound account unbound from the associated application account, and determines, according to the second bound account or the second unbound account, the candidate account providers for displaying on the selection page.

The application account and the associated application account may be two different application accounts of a same user, or may be different application accounts of two members in a family or friends. When the user binds (or associates) the application account to (or with) the associated application account, or creates the application account and the associated application account, the same identity information is adopted, or a same communication mode (such as a phone number) is reserved. Therefore, there is an association relationship between the application account and the associated application account.

In an embodiment, the terminal acquires a card type of the second bound account and acquires a card type of the second unbound account. Then the terminal determines, according to the second bound account and the corresponding card type and the second unbound account and the corresponding card type, the candidate account providers for displaying on the selection page.

In an embodiment, in addition to the second bound account bound to the associated application account and the second unbound account unbound from the associated application account, the terminal may further acquire a provider name of the second bound account and a provider name of the second unbound account, and determine, according to the foregoing provider names, the candidate account providers for displaying on the selection page. For example, when the provider name of the second bound account is the GS bank, and the provider name of the second unbound account is a ZG bank, it may be determined, according to the provider names of the GS bank and the ZG bank, that the first application supports binding functions of the GS bank and the ZG bank. Therefore, the GS bank and the ZG bank may be determined as the candidate account providers to be displayed on the selection page. In this way, the first application is prevented from not supporting the account provider corresponding to the to-be-bound account by the user, so as to avoid poor user experience as a result of the user seeing the entry of the account provider, thereby enhancing user experience.

In an embodiment, when the associated application account is bound to the card account of the resource card, the bound card account (that is, the second bound account) and a corresponding state are saved in the information list. In addition, when the associated application account on the first application is unbound from the card account of the resource card, the terminal also updates a state of the unbound card account (that is, the second unbound account) in the information list.

In an embodiment, when account binding information of the application account and the associated application account is saved in an information management system, the terminal may search, from the information management system according to the associated application account corresponding to the application account, whether the corresponding first bound account or the first unbound account exists. When the first bound account and the first unbound account cannot be found, the terminal further searches for the associated application account associated with the application account, acquires the corresponding second bound account in the bound state or the second unbound account in the unbound state from the information management system according to the application account corresponding to the associated application account, and determines, according to the second bound account or the second unbound account, the candidate account providers for displaying on the selection page. By using the foregoing method, the account provider that is to be associated by the user may be displayed on the selection page as the candidate account provider. The account provider that is not to be associated by the user is not to be displayed on the selection page as the candidate account provider.

For example, when the user has two application accounts a and b, the user taps to query whether there is an Industrial and Commercial Bank of China (ICBC) card in the bound state or in the unbound state on the application account a. If there is no ICBC card, it is further queried whether there is the ICBC card that is bound or unbound on a user WeChat b. If there is the ICBC card, an identifier of the ICBC is displayed in an entry display area corresponding to the selection page. If there is no ICBC card, the entry display area of the ICBC card is not displayed on the selection page.

In an embodiment, before step S204, the terminal encrypts the user identity to obtain an encrypted user identity (or encrypted user identity information), and generates an information acquisition instruction carrying the encrypted user identity. In step S204, the information acquisition instruction carrying the encrypted user identity may be transmitted to the account provider, the transmitted information acquisition instruction being used for instructing the account provider to decrypt the user encryption identity by using a decryption key, search for a matched to-be-bound account by using the decrypted user identity, and return a mask of the to-be-bound account.

In an embodiment, the information acquisition instruction may cause the account provider to perform decryption of the encrypted user identity by using the decryption key, to obtain a decrypted user identity, authentication of the user identity, acquisition of the to-be-bound account associated with the user identity when the user identity is authenticated, transmission of third verification information to the communication device of the to-be-bound account, and calculation of the mask of the to-be-bound account, and transmission of the mask when confirmation information of the third verification information is received.

The third verification information may be a verification code, for example, a text message verification code or a graphic verification code (such as a graphic two-dimensional verification code).

In an embodiment, the operation of authenticating the user identity may include transmitting, by the account provider, the verification code to a communication device of the user identity. The communication device enters the verification code according to an entering instruction after receiving the verification code, and then transmits the entered verification code to the account provider. The account provider verifies whether the two verification codes are consistent, and if so, the authentication succeeds.

In an embodiment, the terminal further transmits the decryption key for decrypting the encrypted user identity to the account provider, so that the account provider extracts the encrypted user identity from the information acquisition instruction during receiving of the information acquisition instruction, and then decrypts the encrypted user identity by using the decryption key, to obtain the user identity.

In an embodiment, the account provider performs mask calculation on the to-be-bound account, that is, a bitwise AND operation is performed on a target field in the to-be-bound account, thereby masking the original to-be-bound account.

In an embodiment, when the addition instruction corresponding to account addition without entering an account identifier triggered by using the account addition page is acquired and the account provider is determined, the terminal acquires bound account information. Step S204 may also include transmitting, to the account provider by the terminal, the information acquisition instruction carrying the bound account information and the user identity, the transmitted information acquisition instruction being used for instructing the account provider to acquire the to-be-bound account according to the user identity and the bound account information, and return the to-be-bound account.

In step S206, the received to-be-bound account is displayed on a gateway page of the account provider.

In an embodiment, before step S206, the terminal jumps from the account provider selection page to a gateway page of the account provider. Step S206 may further include receiving, by the terminal, at least one candidate to-be-bound account associated with the user identity acquired by the account provider; and displaying the received at least one candidate to-be-bound account on the gateway page.

In an embodiment, when the account provider acquires the at least one candidate to-be-bound account associated with the user identity, the acquired at least one candidate to-be-bound account may be transmitted to the terminal for displaying.

In an embodiment, when the to-be-bound account acquired by the account provider according to the user identity is received, the terminal displays the received to-be-bound account on the gateway page to which the terminal jumps.

The to-be-bound account may be an account of the user, or may be an account associated with information about the user, such as an account of a family member or a friend. For example, when the to-be-bound account is the card account of the resource card, the to-be-bound account may be an account held by the user or a relative.

In an embodiment, when the terminal receives the to-be-bound account in a mask form, the to-be-bound account in the mask form is decrypted, to obtain the to-be-bound account that is identifiable by the user. The to-be-bound account in the mask form means that the account provider performs mask calculation on the to-be-bound account, that is, a bitwise AND operation is performed on the target field in the to-be-bound account, thereby obtaining the to-be-bound account in the mask form (that is, a mask of the to-be-bound account).

In an embodiment, after the terminal transmits, to the account provider, the information acquisition instruction carrying the encrypted user identity, the account provider is instructed to search for corresponding candidate accounts from the information list according to the user identity, and it is determined whether the found candidate account is bound to the application account corresponding to the user identity. The candidate accounts bound to the application account are filtered out, so that the obtained unbound candidate account is used as the to-be-bound account and then transmitted to the terminal. The terminal receives the to-be-bound account acquired by the account provider according to the user identity. When a page jumps from the selection page to the gateway page, the received to-be-bound account is displayed on the gateway page to which the terminal jumps.

In step S208, binding between an application account of the first application and the confirmed to-be-bound account of the second application is performed when the displayed to-be-bound account is confirmed by a user operation of the gateway page.

In an embodiment, step S208 may include transmitting, to the account provider, the to-be-bound account and the user identity as account elements for account binding when an operation of confirming the to-be-bound account in the gateway page is received, receiving first verification information fed back by the account provider after verifying the account elements, and binding, based on the first verification information, the to-be-bound account of the second application to the application account of the first application.

The to-be-bound account may be a plurality of to-be-bound accounts, for example, a plurality of accounts that are to be bound but are not bound by the user. The first verification information may be a verification code or a graphic code transmitted by the account provider.

In an embodiment, when the account provider receives the account elements, one-to-one comparison is to be performed on the account elements and stored account elements. When the account elements are consistent with the stored account elements, it indicates that the account transmitted by the terminal is a to-be-bound account registered with the account provider by the user. Therefore, in order to further verify the identity of the user, the first verification information is further transmitted to the terminal.

In an embodiment, the plurality of to-be-bound accounts are presented on the gateway page. The terminal detects, in real time, one to-be-bound account presented in the gateway page selected by tapping by the user, and then transmits the selected to-be-bound account and the user identity as the account elements to the account provider.

For example, as shown in FIG. 4, the user selects, as a bank card that is currently to be bound by the user, a GS bank deposit card having an account number ending with 2839 in FIG. 4(*d*), and then transmits, to the GS bank, the card account of the bank card having an account number ending with 2839 and the user identity as the account elements.

In an embodiment, the operation of binding the to-be-bound account to the application account based on the first verification information may include presenting, by the terminal, a verification page, receiving second verification information entered in the verification page, and transmitting the second verification information to the account provider The transmitted second verification information being used for instructing the account provider to return a verification result when it is determined that the second verification information is the same as the first verification information. The operation of binding the to-be-bound account may include initiating, to the account provider, a signing request carrying the account elements when the verification result is received, the signing request being used for instructing the account provider to generate a signed agreement file according to the account elements and return the signed agreement file. The operation of binding the to-be-bound account may further include recording the signed agreement file and a binding relationship between the to-be-bound account of the second application and the application account on the first application.

The recording the binding relationship may be recording a binding serial number (or a signing serial number). The signed agreement file may refer to an electronic agreement signed between the application account of the user and the account provider of the to-be-bound account for providing a quick service. The electronic agreement includes the binding serial number. In the application scenario for card account binding of the resource card (such as a bank card), the agreement is signed. The user authorizes a payment institution to initiate deduction according to the agreement and a payment instruction.

In an embodiment, when the account provider receives the second verification information for verifying the user identity transmitted by the terminal, the second verification information is compared with the first verification information transmitted to the terminal. When the second verification information is consistent with the first verification information, it is determined that the user corresponding to the user identity is the user himself/herself, and the verification succeeds. In addition, when the signing request carrying the account elements is received, the account provider generates the signed agreement file, and signs related content (for example, stipulating responsibilities and obligations between the user and the account provider, and performing signing) on the signed agreement file.

For example, in the application scenario for card account binding of the resource card, when the to-be-bound bank card is selected, the gateway page is switched to a verification page, as shown in the gateway page of FIG. 4(*d*) and the user verification page of FIG. 4(*e*). The user enters the verification code on the user verification page of FIG. 4(*e*), and then transmits the entered verification code to the GS bank. Upon completion of the verification, a social application is returned, and a request to sign a contract with the GS Bank is initiated by the social application. Upon completion of the signing, the social application may directly acquire all information related to the signing.

Figure 5:
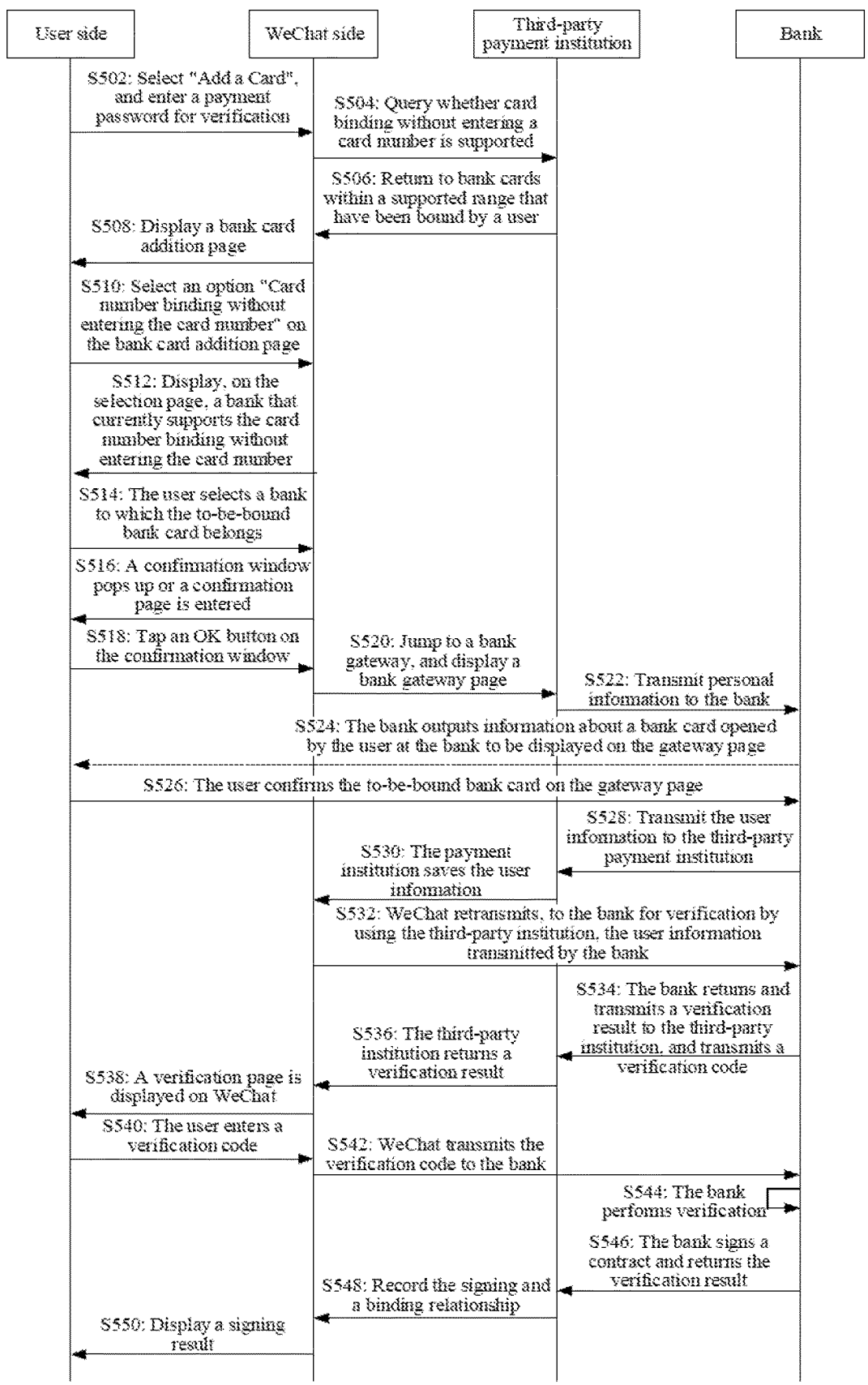
FIG. 5 is a process sequence diagram of a bank account binding method according to an embodiment.

In an example, as shown in FIG. 5, bank account binding and the first application being WeChat having a payment function are used as an example for description. A specific process is described below.

In step S502. A user selects "Add a Card" on WeChat, and enters a payment password for verification.

The user taps to enter WeChat→Me→Pay→Wallet-→Cards tabs or pages, and then performs step S502.

In step S504, whether a function of account addition without entering an account identifier (or card binding without entering a card number) is supported on WeChat is queried, and if so, perform step S506.

In step S506.a third-party payment institution returns to bank cards within a supported range that have been bound by the user.

In step S508, an account (a bank card account) addition page is displayed on WeChat, such as an example shown in FIG. 3(f).

In step S510, the user selects an option "Card number binding without entering the card number" on the bank card addition page.

In step S512, a bank that currently supports the card number binding without entering the card number is displayed on the selection page of WeChat, such as an example shown in FIG. 4(b).

In step S514, the user selects a bank to which the to-be-bound bank card belongs, for example, selects the GS bank in FIG. 4(b).

In step S516, a confirmation window (or a confirmation page is entered) pops up on WeChat.

In step S518, the user taps an OK button on the confirmation window, as shown in FIG. 4(c).

In step S520, after the OK button is tapped, WeChat jumps to a bank gateway, and a bank gateway page is displayed, as shown in FIG. 4(d).

In step S522, the third-party payment institution transmits personal user information (for example, a user identity) to the bank.

In step S524, the bank outputs information about a bank card opened by the user at the bank to be displayed on the gateway page.

In step S526, the user confirms the to-be-bound bank card on the gateway page.

In step S528, the bank transmits the user information to the third-party payment institution (such as Tenpay).

In step S530, the third-party payment institution saves the user information.

In step S532, WeChat retransmits, to the bank for verification by using the third-party payment institution, the user information transmitted by the bank.

In step S534, the bank returns a verification result to the third-party payment institution, and transmits a verification code.

In step S536, the third-party payment institution returns the verification result.

In step S538, a verification page is displayed on WeChat.

In step S540, the user enters the verification code.

In step S542, WeChat transmits the verification code to the bank.

In step S544, the bank performs verification.

In step S546, the bank signs a contract and returns the verification result.

In step S548, the third-party payment institution records the signing and a binding relationship.

In step S550, WeChat records the signing and the binding relationship, and displays a signing result.

In an embodiment, the operation of associating the to-be-bound account of the second application with the application account on the first application based on the first verification information may include presenting a verification page, receiving second verification information entered in the verification page, and transmitting the second verification information to the account provider, the transmitted second verification information being used for instructing the account provider to generate a signed agreement number and card binding information of the application account according to the account element when the second verification information is determined to be the same as the first verification information. The operation of associating the to-be-bound account may further include displaying, when the card binding information is received, prompt information that the to-be-bound account of the second application is bound to the application account on the first application. The signed agreement number may refer to an agreement number for identifying a signed agreement. It may be determined, according to the agreement number, that the application account has been bound to the to-be-bound account.

For example, when the to-be-bound bank card is selected, the gateway page is switched to a verification page, as shown in the gateway page of FIG. 4(d) and the user verification page of FIG. 4(e). The user enters the verification code on the verification page of FIG. 4(e), and then transmits the entered verification code to the GS bank. Upon completion of the verification, signing is directly performed by the GS bank. During the completion of the signing, a social application does not sense the signing information of the user, such as a card account number, a signed agreement number, a user phone number, and the like.

In an embodiment, the first application is a social application having a payment function. After the to-be-bound account is associated with the application account on the social application, the terminal receives a to-be-bound account element provided by the to-be-bound account provider. The to-be-bound account element includes a target to-be-bound account. The to-be-bound account element is presented on an information entry page of the social application. When a trigger operation on the to-be-bound account element is received, the gateway page is entered, and account information in the to-be-bound account element is presented. When a confirmation instruction on the account information is received, the to-be-bound account element is transmitted to the account provider, so that the account provider generates a signed agreement file according to the account element, and returns a target signed agreement file. When the target signed agreement file is received, the target to-be-bound account is bound to the application account.

The to-be-bound account provider may refer to the account provider that manages a resource card offline with the user and opens quick payment.

In an embodiment, after the terminal transmits the to-be-bound account element to the to-be-bound account provider, the to-be-bound account provider verifies the received to-be-bound account element, and transmits a verification code to the terminal by using a text message after the verification succeeds. When the terminal receives the entered verification code, the entered verification code is transmitted to the to-be-bound account provider by using the social application. After the to-be-bound account provider verifies the received verification code without an error, the verification result and the target signed agreement file are returned to the terminal. After the terminal receives the verification result and the target signed agreement file, the target to-be-bound account is bound to the application account.

Figure 6:
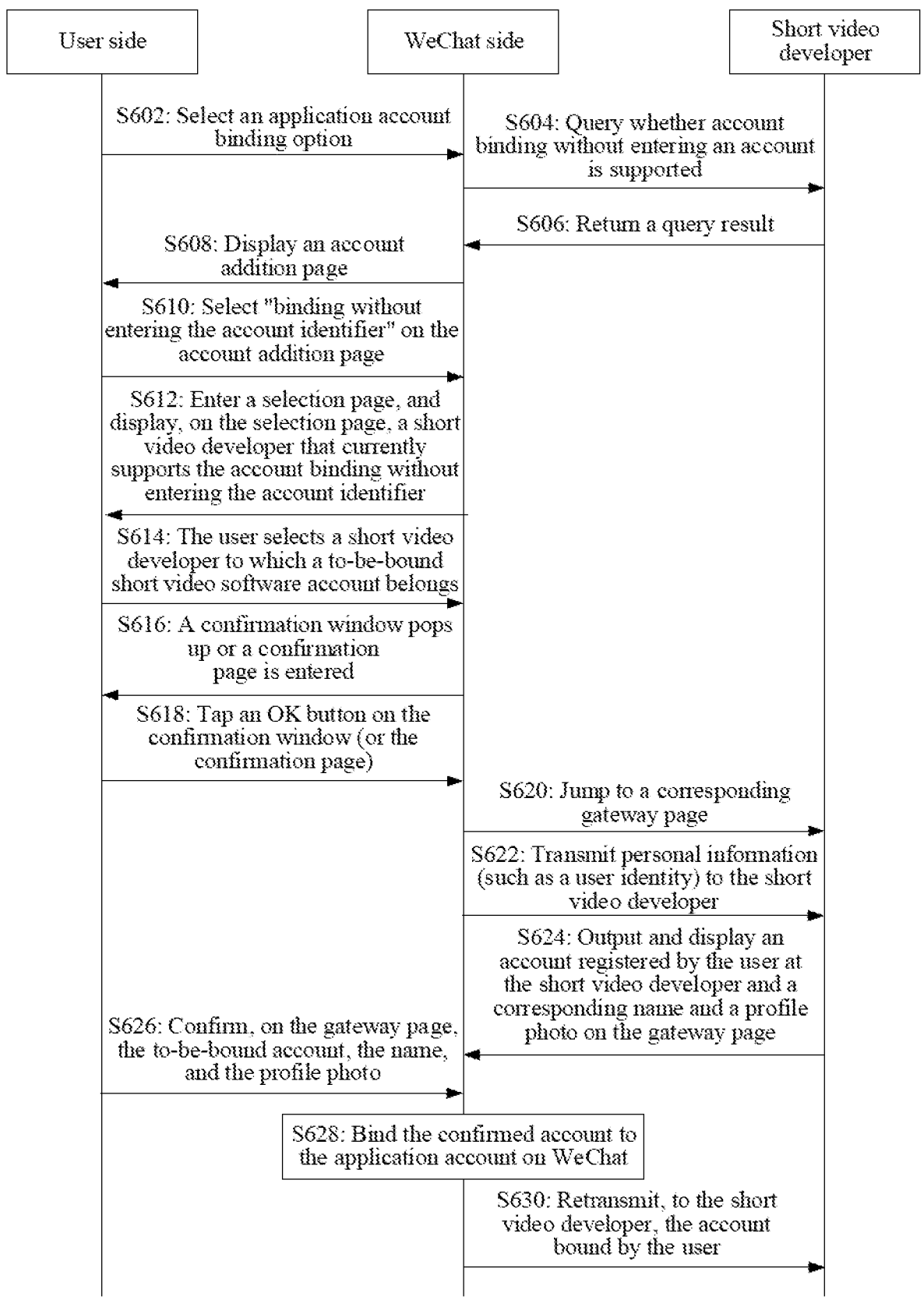
FIG. 6 is a process sequence diagram of a method for binding a short video application account according to an embodiment.

In an example, as shown in FIG. 6, short video application account binding and the first application being WeChat having a payment function are used as an example for description. A specific process is described below.

In step S602, an application account binding option on WeChat is selected.

During the selection of the application account binding option, the verification page may be entered, and the user is instructed to enter a password for verification.

In step S604, whether account binding without entering the account identifier is supported.

For example, it is queried whether an account provider corresponding to a to-be-bound account of the second application by the user supports the function of binding without entering the account identifier, and if so, the account binding without entering the account identifier may be performed.

In step S606, an account provider (that is, a short video developer) of a short video application returns a query result.

In step S608, an account addition page is displayed on WeChat.

In step S610, the user selects an option "binding without entering the account identifier" on the account addition page.

In step S612, a selection page of WeChat is entered, and a short video developer that currently supports the account binding without entering the account identifier is displayed on the selection page.

In step S614, the user selects a short video developer to which a to-be-bound short video software account belongs, such as Kwai, TikTok, and the like.

In step S616, a confirmation window (or a confirmation page is entered) pops up on WeChat.

In step S618, the user taps an OK button on the confirmation window (or the confirmation page).

In step S620, after the OK button is tapped, the page of WeChat jumps to a corresponding gateway page.

In step S622. WeChat transmits personal information (such as the user identity) to the short video developer.

In step S624, the short video developer outputs an account registered by the user at the short video developer and a corresponding name and a head portrait to be displayed on the gateway page.

In step S626, the user confirms, on the gateway page, the to-be-bound account, the name, and the head portrait.

When the user registers a plurality of accounts at the short video developer, WeChat may display all accounts of the user on the gateway page.

In step S628. WeChat binds the confirmed account to the application account on WeChat.

In step S630, WeChat retransmits, to the short video developer, the account bound by the user, so that the short video developer can record the user bound to the account.

In the foregoing embodiments, the account addition instruction is triggered on the account addition page, then the information acquisition instruction carrying the user identity is transmitted to the account provider, to acquire the to-be-bound account provided by the account provider associated with the user identity, and then the to-be-bound account is displayed. The to-be-bound account may be bound to the confirmed to-be-bound account after being confirmed. Therefore, the to-be-bound account can be bound without manually entering the account number (or account identifier) by the user. In this way, the time for account binding is effectively shortened, and in a scenario that the user forgets the account number, the account binding can also be implemented.

In an example, bank account binding and the first application being WeChat having a payment function are used as an example for description. A corresponding process may include operations described below.

1) The user signs an agreement file for association of bank card accounts between WeChat Pay and a bank when a card is opened at an offline outlet or a credit card is opened.

2) The bank transmits elements (such as a card number, a name, an identity type, an identity number, and a mobile number) related to the bank card to a back end of WeChat.

3) The back end of WeChat is associated with the user account according to the mobile number, and uses the elements related to the bank card as pre-bound information to be pushed to the user via official accounts. In addition, the elements related to the bank card may further be stored.

4) After the user taps the received push message, the stored card number is masked for presenting.

5) The user taps "confirm binding" after confirming that the bank card elements are correct.

6) WeChat transmits the bank card elements to the corresponding bank.

7) The bank transmits a verification code after authentication succeeds.

8) The user enters the verification code on WeChat, and WeChat transmits the verification code to the bank.

9) The bank returns a verification result after the authentication succeeds.

10) WeChat binds the verified bank card account to the application account on WeChat after receiving the result.

In another example, bank account binding and the first application being WeChat having a payment function are used as an example for description. A corresponding process may include operations described below.

1) The user selects Wallet→Bank card→Add a Card tabs or pages.

2) Enter a payment password for WeChat Pay to verify whether the user itself is operating the WeChat Pay.

3) Jump to the page of Add a Card, and select account addition without entering an account identifier for quick addition;

4) Select the bank to which a bank account to be added belongs.

5) A box pops out on WeChat Pay, and the user confirms to open the bank gateway page of the to-be-added bank card.

6) In WeChat Pay, real-name information (a name and a card number) of the user and type information of a card required to be added is transmitted to the bank.

7) The bank queries and displays the account information (the card number) of the user opened at the bank on the gateway page.

8) The user selects the bank account required to be bound.

9) The WeChat Pay transmits the user bank card elements to the bank.

10) The bank transmits a text message verification code after the authentication succeeds.

11) The user enters the correct verification code on the WeChat Pay page.

12) The bank performs successful authentication.

13) WeChat associates the bank account with WeChat Pay.

In another example, bank account binding and the first application being WeChat having a payment function are used as an example for description. A corresponding process may include operations described below.

1) The user taps to enter WeChat→Me→Pay→Wallet-→Cards tabs or pages.

2) Select "Add a Card", and enter a password on the displayed user verification page to perform personal information verification, as shown in FIG. 3(e).

3) Enter the account addition page after password verification is correct, and directly select dispensing with account entering for quick addition under the account addition page, as shown in FIG. 3(f).

4) Enter a selection page, and select a bank to which the to-be-bound bank card belongs.

5) A confirmation window pops out (or jump to a confirmation page), as shown in FIG. 4(c). In addition, the user may manually tap an OK button and enters the bank gateway page.

6) According to the bank selected by the user, a name and tail numbers of a bound card are transmitted to the bank.

7) The bank displays all unbound bank card account information of the user at the bank on the bank gateway page.

8) The user selects one of the bank card accounts to perform binding, and the bank transmits a verification text message to a mobile phone of the user.

9) The user enters a verification code on the bank gateway page and taps OK.

10) The bank transmits card binding information including a card number, a mobile number, and a signed agreement number to WeChat.

11) WeChat directly displays binding completed after receiving the information transmitted by the bank.

By means of the solutions of the foregoing embodiments, the beneficial effects may include at least one or more of the following.

(1) The to-be-bound account (such as a bank card account) associated with the user identity is directly acquired from the account provider. Therefore, the account binding can also be implemented without manually entering the account number by the user, thereby effectively shortening the time of account binding and enhancing the efficiency of the account binding.

(2) Since the to-be-bound account does not need to be manually entered by the user, in a scenario that the user forgets the account number, the account binding can also be implemented, so that an account binding rate can be increased.

(3) The manner of performing binding only by manually entering the to-be-bound account by the user is avoided, and the manner of performing binding only by login from the account provider application (APP) and jumping to the payment institution APP (such as a social application having a payment function) is also avoided, so that all binding operations dispensing with account entering may be directly completed on the payment institution APP.

(4) From the user perspective, the operation experience is greatly improved. Therefore, the problem that the binding cannot be completed as a result of a case that the user does not carry the corresponding card (such as a bank card) or forgets the corresponding card account is resolved, thereby reducing an error in entering the card account number during the binding, reducing complaints from users about card account issues, increasing the success rate of account binding, and improving user experience.

(5) From the perspective of the account provider, an amount of binding between accounts (such as a bank card account and a video application account) and the application account of the user can be increased. In this way, active users using the method to bind accounts can be greatly increased, and user big data can be mined according to further data analysis.

(6) From the perspective of the payment institution, the amount of account binding is further increased, the user coverage of the payment institution is enhanced, and the client complaint rate is reduced.

It should be understood that steps in flowcharts of FIG. 2, FIG. 5, and FIG. 6 are displayed in sequence based on indication of arrows, but the steps are not necessarily performed in sequence based on a sequence indicated by the arrows. Unless clearly specified in this specification, there is no strict sequence limitation on the execution of the steps, and the steps may be performed in another sequence. In addition, at least some steps in FIG. 2. FIG. 5 and FIG. 6 may include a plurality of steps or a plurality of stages, and these steps or stages are not necessarily performed at a same time instant, and may be performed at different time instants. The steps or stages are not necessarily performed in sequence, and the steps or stages may be performed alternately with at least some of other steps or stages of other steps.

Figure 7:
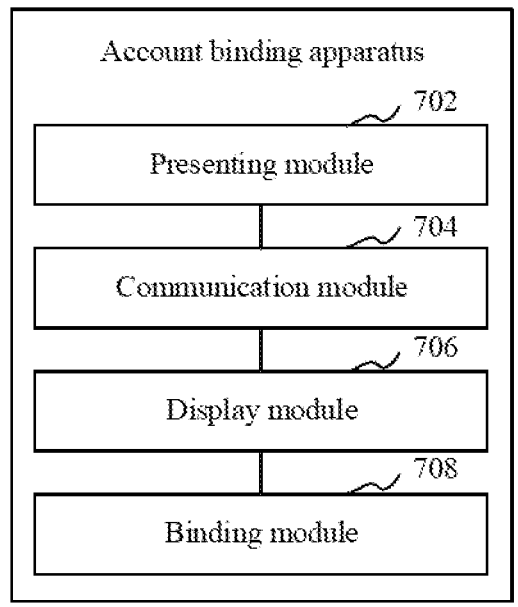
FIG. 7 is a block diagram of an account binding apparatus in an application according to an embodiment.

In an embodiment, as shown in FIG. 7, an account binding apparatus is provided. The apparatus may use a software module or a hardware module, or a combination of the software module and the hardware module to become a part of a terminal. The apparatus specifically includes a presenting module 702, a communication module 704, a display module 706, and a binding module 708.

The presenting module 702 is configured to present an account addition page in a first application that is currently logged into.

The communication module 704 is configured to transmit, to the account provider by using an account addition instruction triggered by using the account addition page, an information acquisition instruction carrying an encrypted user identity and then receive a to-be-bound account that is associated with a user identity acquired and fed back by an account provider. The to-be-bound account includes a user account of a second application and is an account fed back after the account provider attempts to authenticate the user identity and the user identity is authenticated by a communication device of the to-be-bound account.

The display module 706 is configured to display the received to-be-bound account on a gateway page of the account provider.

The binding module 708 is configured to perform binding between an application account of the first application and the confirmed to-be-bound account of the second application when the displayed to-be-bound account is confirmed.

In an embodiment, the communication module 704 is further configured to, when an addition instruction corresponding to account addition without entering an account identifier is triggered by using the account addition page is acquired, jump from the account addition page to an account provider selection page, determine the account provider from candidate account providers displayed on the account provider selection page, and transmit, to the account provider, the information acquisition instruction carrying the encrypted user identity.

Figure 8:
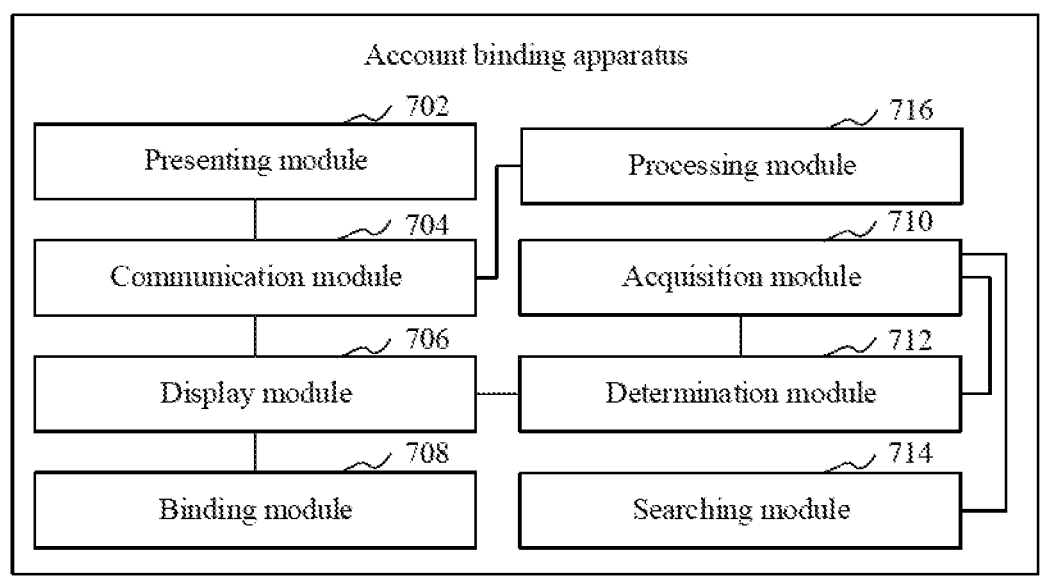
FIG. 8 is a block diagram of an account binding apparatus in an application according to an embodiment.

In an embodiment, as shown in FIG. 8, the apparatus may further include an acquisition module 710 and a determination module 712.

The acquisition module 710 is configured to acquire a first bound account bound to an application account on the first application; or acquire a first unbound account unbound from the application account on the first application.

The determination module 712 is configured to determine, according to the first bound account or the first unbound account, candidate account providers for displaying on the selection page.

In an embodiment, as shown in FIG. 8, the apparatus may further include a searching module 714.

The searching module 714 is configured to search for an associated application account associated with the application account.

The acquisition module 710 is further configured to acquire a second bound account bound to the associated application account; or acquire a second unbound account unbound from the associated application account, and The determination module 712 is configured to determine, according to the second bound account or the second unbound account, candidate account providers for displaying on the selection page.

In an embodiment, the presenting module 708 is further configured to jump from the account provider selection page to the gateway page of the account provider, receive at least one to-be-bound account that is associated with the user identity acquired and fed back by the account provider; and display the received to-be-bound account on the gateway page.

In an embodiment, the binding module 708 is further configured to, when an operation of confirming the to-be-bound account in the gateway page is received, transmit, to the account provider, the to-be-bound account and the user identity as account elements for account binding. The binding module 708 may be further configured to receive first verification information fed back by the account provider after verifying the account elements, and bind, based on the first verification information, the to-be-bound account of the second application to the application account of the first application.

In an embodiment, the binding module 708 is further configured to present a verification page, receive second verification information entered in the verification page, and transmit the second verification information to the account provider, the transmitted second verification information being used for instructing the account provider to return a verification result when it is determined that the second verification information is the same as the first verification information. The binding module 708 may be further configured to initiate, to the account provider, a signing request carrying the account elements when the verification result is received, the signing request being used for instructing the account provider to generate a signed agreement file according to the account elements and return the signed agreement file. The binding module 708 may be further configured to record the signed agreement file and a binding relationship between the to-be-bound account of the second application and the application account on the first application.

In an embodiment, the binding module 708 is further configured to present a verification page, receive second verification information entered in the verification page, and transmit the second verification information to the account provider, the transmitted second verification information being used for instructing the account provider to generate a signed agreement number and card binding information of the application account according to the account element when the second verification information is determined to be the same as the first verification information. The binding module 708 may be further configured to display, when the card binding information is received, prompt information that the to-be-bound account of the second application is bound to the application account on the first application.

In an embodiment, as shown in FIG. 8, the apparatus further includes a processing module 716.

The processing module 716 is configured to encrypt the user identity to obtain an encrypted user identity, and generate an information acquisition instruction carrying the encrypted user identity.

The communication module 704 is further configured to transmit, to the account provider, the information acquisition instruction carrying the encrypted user identity. The transmitted information acquisition instruction is used for instructing the account provider to decrypt the user encryption identity by using a decryption key, search for a matched to-be-bound account by using the decrypted user identity, and return a mask of the to-be-bound account.

In an embodiment, the communication module 704 is further configured to instruct, by using the information acquisition instruction, the account provider to decrypt the encrypted user identity by using the decryption key, to obtain the decrypted user identity. The communication module 704 may be further configured to cause the account provider, by using the information acquisition instruction, to attempt to authenticate the user identity, acquire the to-be-bound account associated with the user identity when the user identity is authenticated, transmit third verification information to the communication device of the to-be-bound account, and calculate the mask of the to-be-bound account, and transmit the mask when confirmation information of the third verification information is received.

In an embodiment, the acquisition module 710 is further configured to acquire bound account information when the account addition instruction triggered by using the account addition page is acquired.

The communication module 704 is further configured to transmit, to the account provider, the information acquisition instruction carrying the bound account information and the encrypted user identity. The transmitted information acquisition instruction is used for instructing the account provider to acquire and return the to-be-bound account according to the bound account information and the user identity.

In the foregoing embodiments, the account addition instruction is triggered on the account addition page, then the information acquisition instruction carrying the user identity is transmitted to the account provider, to acquire the to-be-bound account provided by the account provider associated with the user identity, and then the to-be-bound account is displayed. The to-be-bound account may be bound to the confirmed to-be-bound account after being confirmed. Therefore, the to-be-bound account can be bound without manually entering the account number (or account identifier) by the user. In this way, the time for account binding is effectively shortened, and in a scenario that the user forgets the account number, the account binding can also be implemented.

For other details on the account binding apparatus, reference may be made to the disclosure on the account binding method above, and the details are not described herein again. Each module in the foregoing account binding apparatus may be implemented entirely or partly by software, hardware, or a combination thereof. The foregoing modules may be embedded in or independent of a processor in a terminal in the form of hardware, or may be stored in a memory in the terminal in the form of software, so that the processor can call and execute the operations corresponding to the foregoing modules. Of course, it should be understood that one or more of the modules described in this disclosure can be implemented by hardware, for example, circuitry.

In an embodiment, a computer device is provided. The computer device may be a terminal, or may be a server. When the computer device is the terminal, an internal structure diagram of the terminal may be shown in FIG. 9. The terminal includes a processor, a memory, a communication interface, a display screen, and an input apparatus that are connected by using a system bus. The processor of the terminal is configured to provide computing and control capabilities. The memory of the terminal includes a non-transitory storage medium or an internal memory. The non-transitory storage medium stores an operating system and a computer program. The internal memory provides an environment for the running of the operating system and the computer program in the non-transitory storage medium. The communication interface of the terminal is used for wired or wireless communication with an external terminal. The wireless communication may be implemented by Wi-Fi, an operator network, near field communication (NFC), or other technologies. In some embodiments, computer program (or instructions) implements the account binding method when executed by the processor. The display screen of the terminal may be a liquid crystal display screen or an e-ink display screen. The input apparatus of the terminal may be a touch layer covering the display screen, or may be a key, a track ball, or a touchpad disposed on a housing of the terminal, or may be an external keyboard, touchpad, mouse, or the like.

In an embodiment, a computer device is provided. The computer device may be a server. An internal structure diagram of the server may be shown in FIG. 10. The server includes a processor, a memory, and a network interface that are connected by using a system bus. The processor of the server is configured to provide computing and control capabilities. The memory of the server includes a non-transitory storage medium or an internal memory. The non-transitory storage medium stores an operating system, a computer program, and a database. The internal memory provides an environment for the running of the operating system and the computer program in the non-transitory storage medium. The database of the server is configured to store user data. The network interface of the server is configured to communicate with an external server via a network connection. The computer program (or instructions) implements the account binding method when executed by the processor.

Figure 9:
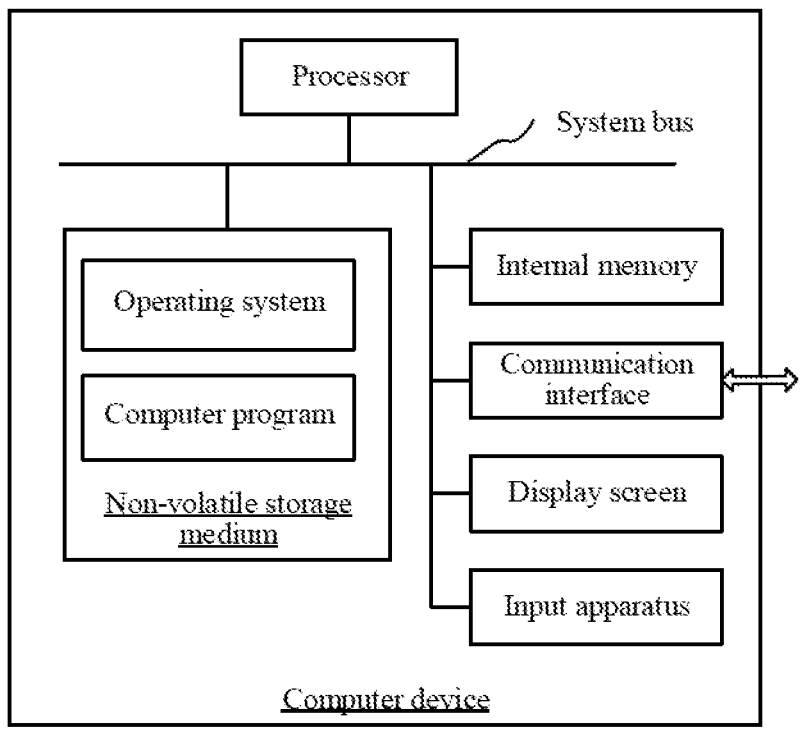
FIG. 9 is a diagram of an internal structure of a computer device according to an embodiment.
Figure 10:
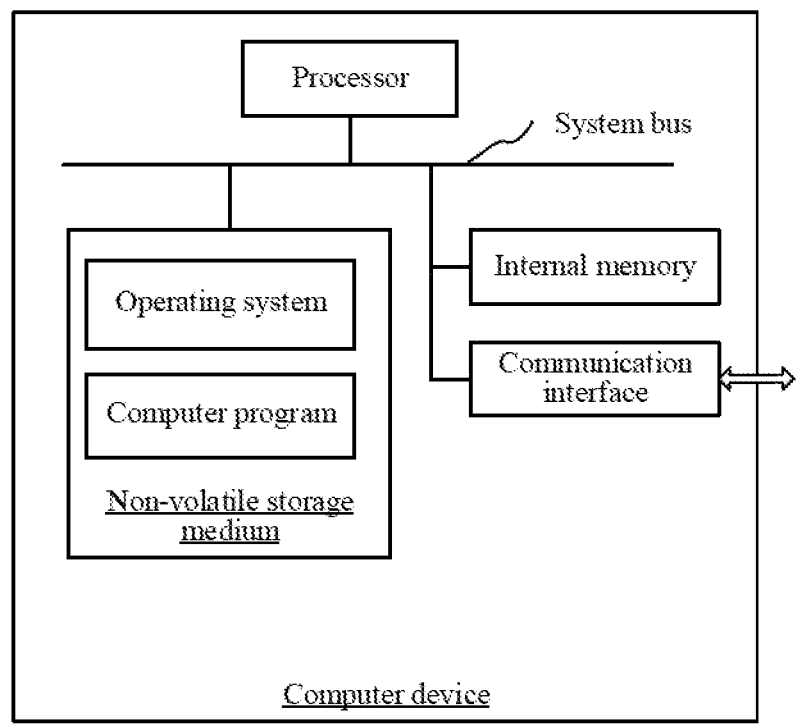
FIG. 10 is a diagram of an internal structure of a computer device according to an embodiment.

A person skilled in the art may understand that, in the structure shown in FIG. 9 and FIG. 10, only a block diagram of a partial structure related to a solution in this application is shown, and does not constitute a limit to the terminal to which the solution in this application is applied. Specifically, the terminal may include more components or fewer components than those shown in the figure, or some components may be combined, or a different component deployment may be used.

In an embodiment, a computer device is further provided, including a memory and a processor. The memory is a non-transitory storage medium stores a computer program (or instructions). The processor implements the operations in the foregoing method embodiments when executing the computer program.

In an embodiment, a non-transitory computer-readable storage medium is provided, storing a computer program (or instructions). The computer program, when executed by a processor, causes the processor to perform the operations in the foregoing method embodiments.

In an embodiment, a computer program product or a computer program is provided. The computer program product or the computer program includes computer instructions, and the computer instructions are stored in a non-transitory computer-readable storage medium. A processor of a computer device causes the computer device to perform the operations in the foregoing method embodiments when reading the computer instruction from the computer-readable storage medium and executing the computer instruction.

A person of ordinary skill in the art may understand that all or some of the processes of the methods in the foregoing embodiments may be implemented by a computer program instructing relevant hardware. The computer program may be stored in a non-transitory computer-readable storage medium. When the computer program runs, the processes of the foregoing methods in the embodiments are performed. The non-transitory memory in a computer may include a read-only memory (ROM), a magnetic tape, a floppy disk, a flash memory, an optical memory, or the like. The computer may further include other type of memory such as a random access memory (RAM), and the RAM may be in various forms, such as a static random access memory (SRAM), a dynamic random access memory (DRAM), or the like.

The technical features in the foregoing embodiments may be combined in other manners. For concise description, not all possible combinations of the technical features in the embodiments are described. However, provided that combinations of the technical features do not conflict with each other, the combinations of the technical features are considered as falling within the scope described in this specification.

The foregoing embodiments only describe several implementations of this application, which are described specifically and in detail, and therefore cannot be construed as a limitation to the patent scope of the present disclosure. For a person of ordinary skill in the art, several variations and improvements may be made without departing from the idea of this application. These variations and improvements may still fall within the protection scope of this application. Therefore, the protection scope of this application is subject to the protection scope of the appended claims.

What is claimed is:

1. An account binding method, comprising:
presenting, by processing circuitry of a computer device, an account addition page in a first social networking application that is currently logged into using a user account of the first social networking application;
in response to an account addition instruction, corresponding to a function of account addition without entering an account identifier, being triggered by using the account addition page,
jumping from the account addition page to an account provider selection page;
determining an account provider system to which an information acquisition instruction is to be transmitted from candidate account provider systems displayed on the account provider selection page;
encrypting user identity information of the user account of the first social networking application to obtain encrypted user identity information;
generating the information acquisition instruction to the account provider system, the information acquisition instruction including the encrypted user identity information; and
transmitting by the computer device the information acquisition instruction to the account provider system, the information acquisition instruction including the encrypted user identity information, the transmitted information acquisition instruction instructing the account provider system to decrypt the encrypted user identity information by using a decryption key, search for at least one candidate to-be-bound account by matching the decrypted user identity information, and return a mask of the at least one candidate to-be-bound account, wherein the account addition instruction received through the account addition page does not include the account identifier of the account provider system;

receiving the at least one candidate to-be-bound account that is associated with the user identity information in the account provider system;

in response to (i) a selection of a to-be-bound account from the received at least one candidate to-be-bound account associated with the user identity information and (ii) authentication by the account provider system via a communication method associated with the to-be-bound account, displaying the to-be-bound account on a gateway page of the account provider system; and in response to a confirmation user operation on the gateway page of the account provider system, binding the user account of the first social networking application and the to-be-bound account such that payment from the to-be-bound account may be authorized by the user account of the first social networking application.

2. The method according to claim 1, further comprising:

acquiring a first bound account bound to the user account of the first social networking application, or acquiring a first unbound account unbound from the user account of the first social networking application; and determining, according to the first bound account or the first unbound account, the candidate account provider systems to be displayed on the account provider selection page.

3. The method according to claim 2, further comprising:

searching for an associated account associated with the user account of the first social networking application;

acquiring a second bound account bound to the associated account, or acquiring a second unbound account unbound from the associated account; and determining, according to the second bound account or the second unbound account, the candidate account provider systems to be displayed on the account provider selection page.

4. The method according to claim 2, wherein before the receiving the at least one candidate to-be-bound account associated with the user identity information, the method further comprises:

jumping from the account provider selection page to the gateway page of the account provider system;

receiving the at least one candidate to-be-bound account that is associated with the user identity information and acquired and fed back by the account provider system; and displaying the at least one candidate to-be-bound account on the gateway page.

5. The method according to claim 4, wherein the binding the user account of the first social networking application and the to-be-bound account comprises:

transmitting, to the account provider system, the to-be-bound account and the user identity information as account elements for account binding when the user operation of confirming the to-be-bound account in the gateway page is received;

receiving first verification information fed back by the account provider system after verifying the account elements; and binding, based on the first verification information, the to-be-bound account to the user account of the first social networking application.

6. The method according to claim 5, wherein the binding, based on the first verification information, the to-be-bound account to the user account of the first social networking application comprises:

presenting a verification page;

receiving second verification information entered in the verification page;

transmitting the second verification information to the account provider system, the transmitted second verification information instructing the account provider system to return a verification result when it is determined that the second verification information is the same as the first verification information;

initiating a signing request to the account provider system when the verification result is received, the signing request carrying the account elements, the signing request instructing the account provider system to generate a signed agreement file according to the account elements and return the signed agreement file; and recording the signed agreement file and a binding relationship between the to-be-bound account and the user account on the first social networking application.

7. The method according to claim 5, wherein the binding, based on the first verification information, the to-be-bound account to the user account of the first social networking application comprises:

presenting a verification page;

receiving second verification information entered in the verification page;

transmitting the second verification information to the account provider system, the transmitted second verification information instructing the account provider system to generate a signed agreement number and card binding information of the user account of the first social networking application according to the account elements when it is determined that the second verification information is the same as the first verification information; and displaying, when the card binding information is received, prompt information that the to-be-bound account is bound to the user account of the first social networking application.

8. An account binding apparatus, comprising:

processing circuitry configured to:
present an account addition page in a first social networking application that is currently logged into using a user account of the first social networking application;

in response to an account addition instruction, corresponding to a function of account addition without entering an account identifier, being triggered by using the account addition page, jump from the account addition page to an account provider selection page;

determine an account provider system to which an information acquisition instruction is to be transmitted from candidate account provider systems displayed on the account provider selection page;

encrypt user identity information of the user account of the first social networking application to obtain encrypted user identity information;

generate the information acquisition instruction to the account provider system, the information acquisition instruction including the encrypted user identity information; and transmit the information acquisition instruction to the account provider system, the information acquisition instruction including the encrypted user identity information, the transmitted information acquisition instruction instructing the account provider system to decrypt the encrypted user identity information by using a decryption key, search for at least one candidate to-be-bound account by matching the decrypted user identity information, and return a mask of the at least one candidate to-be-bound account, wherein the account addition instruction received through the account addition page does not include the account identifier of the account provider system;

receive the at least one candidate to-be-bound account that is associated with the user identity information in the account provider system;

in response to (i) a selection of a to-be-bound account from the received at least one candidate to-be-bound account associated with the user identity information and (ii) authentication by the account provider system via a communication method associated with the to-be-bound account, display the to-be-bound account on a gateway page of the account provider system; and in response to a confirmation user operation on the gateway page of the account provider system, bind the user account of the first social networking application and the to-be-bound account such that payment from the to-be-bound account may be authorized by the user account of the first social networking application.

9. The apparatus according to claim 8, wherein the processing circuitry is further configured to:

acquire a first bound account bound to the user account of the first social networking application, or acquire a first unbound account unbound from the user account of the first social networking application; and determine, according to the first bound account or the first unbound account, the candidate account provider systems to be displayed on the account provider selection page.

10. The apparatus according to claim 9, wherein the processing circuitry is further configured to:

search for an associated account associated with the user account of the first social networking application;

acquire a second bound account bound to the associated account, or acquire a second unbound account unbound from the associated account; and determine, according to the second bound account or the second unbound account, the candidate account provider systems to be displayed on the account provider selection page.

11. The apparatus according to claim 9, wherein the processing circuitry is further configured to:

jump from the account provider selection page to the gateway page of the account provider system;

receive the at least one candidate to-be-bound account that is associated with the user identity information and acquired and fed back by the account provider system; and display the at least one candidate to-be-bound account on the gateway page.

12. The apparatus according to claim 11, wherein the processing circuitry is further configured to:

transmit, to the account provider system, the to-be-bound account and the user identity information as account elements for account binding when the user operation of confirming the to-be-bound account in the gateway page is received;

receive first verification information fed back by the account provider system after verifying the account elements; and bind, based on the first verification information, the to-be-bound account to the user account of the first social networking application.

13. The apparatus according to claim 12, wherein the processing circuitry is further configured to:

present a verification page;

receive second verification information entered in the verification page;

transmit the second verification information to the account provider system, the transmitted second verification information instructing the account provider system to return a verification result when it is determined that the second verification information is the same as the first verification information;

initiate a signing request to the account provider system when the verification result is received, the signing request carrying the account elements, the signing request instructing the account provider system to generate a signed agreement file according to the account elements and return the signed agreement file; and record the signed agreement file and a binding relationship between the to-be-bound account and the user account on the first social networking application.

14. A non-transitory computer-readable storage medium storing instructions which when executed by a processor cause the processor to perform:

presenting an account addition page in a first social networking application that is currently logged into using a user account of the first social networking application;

in response to an account addition instruction, corresponding to a function of account addition without entering an account identifier, being triggered by using the account addition page, jumping from the account addition page to an account provider selection page;

determining an account provider system to which an information acquisition instruction is to be transmitted from candidate account provider systems displayed on the account provider selection page;

encrypting user identity information of the user account of the first social networking application to obtain encrypted user identity information;

generating the information acquisition instruction to the account provider system, the information acquisition instruction including the encrypted user identity information; and transmitting the information acquisition instruction to the account provider system, the information acquisition instruction including the encrypted user identity information, the transmitted information acquisition instruction instructing the account provider system to decrypt the encrypted user identity information by using a decryption key, search for at least one candidate to-be-bound account by matching the decrypted user identity information, and return a mask of the at least one candidate to-be-bound account, wherein the account addition instruction received through the account addition page does not include the account identifier of the account provider system;

receiving the at least one candidate to-be-bound account that is associated with the user identity information in the account provider system;

in response to (i) a selection of a to-be-bound account from the received at least one candidate to-be-bound account associated with the user identity information and (ii) authentication by the account provider system via a communication method associated with the to-be-bound account, displaying the to-be-bound account on a gateway page of the account provider system; and in response to a confirmation user operation on the gateway page of the account provider system, binding the user account of the first social networking application and the to-be-bound account such that payment from the to-be-bound account may be authorized by the user account of the first social networking application.

15. The non-transitory computer-readable storage medium according to claim 14, wherein the instructions when executed by the processor further cause the processor to perform:

acquiring a first bound account bound to the user account of the first social networking application, or acquiring a first unbound account unbound from the user account of the first social networking application; and determining, according to the first bound account or the first unbound account, the candidate account provider systems to be displayed on the account provider selection page.

* * * * *

UNITED STATES PATENT AND TRADEMARK OFFICE
CERTIFICATE OF CORRECTION

| | | |
|---|---|---|
| PATENT NO. | : 12,229,771 B2 | Page 1 of 1 |
| APPLICATION NO. | : 17/680233 | |
| DATED | : February 18, 2025 | |
| INVENTOR(S) | : Shuzhen Wu | |

It is certified that error appears in the above-identified patent and that said Letters Patent is hereby corrected as shown below:

On the Title Page

Item (71), the Applicant city reads as:
Guangdong (CN)

Should read as:
--Shenzhen (CN)--

Signed and Sealed this
Eighteenth Day of March, 2025

Coke Morgan Stewart
*Acting Director of the United States Patent and Trademark Office*